Figure 1:
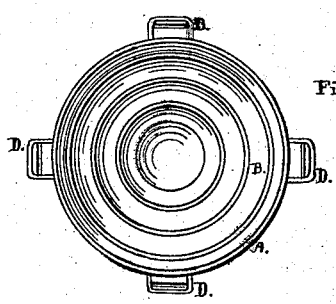

F. SCHMITT.
Beer-Coolers.

No. 138,289.

Patented April 29, 1873.

Witnesses:

Inventor:
Friedrich Schmitt

UNITED STATES PATENT OFFICE.

FRIEDRICK SCHMITT, OF MILWAUKEE, WISCONSIN.

IMPROVEMENT IN BEER-COOLERS.

Specification forming part of Letters Patent No. 138,289, dated April 29, 1873; application filed March 24, 1873.

*To all whom it may concern:*

Be it known that I, FRIEDRICK SCHMITT, of Milwaukee, in the county of Milwaukee in the State of Wisconsin, have invented certain Improvements in Beer-Coolers, of which the following is a specification:

Nature and Object of the Invention.

My invention is an improvement in beer-coolers, and consists in a floating pan constructed of metal, and strengthened by wires inserted around the body of the pan; on the inside is a cross-piece of metal across the bottom. This pan is filled with ice and then floated on the top of a tub of beer, and is valuable, for the reason that the outside is smooth, and the accumulations that usually collect on the outside where the wire strengthener is put are avoided.

Description of the Drawing forming part of this Specification.

Figure 2:
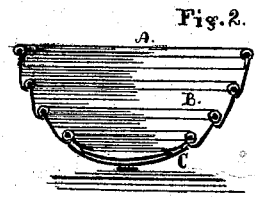

Figure 1 is a perspective view of the pan, and Fig. 2 a sectional view.

General Description.

A is the body of the pan. B are the strengthening-wires around the inside of the pan; D, handles; C, cross-pieces to strengthen the bottom of the pan.

This pan is partly filled with ice and set on the top of the beer, and, floating about, cools the beer on the top, which then settles to the bottom, and the hot beer rises to the top.

Claim.

I claim as my invention—

A beer-cooler constructed with body A with wires B round the inside to strengthen it, and cross-pieces C secured across the bottom, all in combination, substantially as described.

FRIEDRICK SCHMITT.

Witnesses:
J. B. SMITH,
F. L. SCHMITT.